Dec. 31, 1929.　　　F. M. RITTER　　　1,741,376

CUTTING REEL FOR LAWN MOWERS

Original Filed Aug. 26, 1927

Ledger Bar.

INVENTOR
Frank M. Ritter.

BY Chas. J. Diller
ATTORNEY

Patented Dec. 31, 1929

1,741,376

UNITED STATES PATENT OFFICE

FRANK MONTGOMERY RITTER, OF WASHINGTON, DISTRICT OF COLUMBIA, ASSIGNOR OF THREE-FOURTHS TO JAMES VANSANDT HUTCHINS, OF WASHINGTON, DISTRICT OF COLUMBIA

CUTTING REEL FOR LAWN MOWERS

Original application filed August 26, 1927, Serial No. 215,720. Divided and this application filed June 9, 1928. Serial No. 284,135.

The invention generally relates to lawn mowers and primarily has for its object to provide a novel cutting reel for lawn mowers preferably employed in use as illustrated in my copending application for patent filed August 26, 1927, Serial Number 215,720, (now Patent 1,677,250, issued July 17, 1928) of which this present application is a division.

In its more detailed nature the invention has for its object to provide a novel construction of cutting reel particularly adapted for cutting tall grass and weeds and wherein is provided a plurality of straight cutter blades arranged at alternate sides of and overlapping a medial plane and adapted to alternately coact with a straight transverse ledger bar to break-cut the weeds or tall grass in an efficient and balanced manner and with the expenditure of a minimum of power, and in a manner appreciably reducing wear of the moving parts.

The invention further comprehends the provision of rigid carrier bars and thin blades mounted on the carrier bars and readily removable and replaceable when in need of sharpening or when broken.

Other objects will in part be obvious and in part be pointed out hereinafter.

To the attainment of the aforesaid objects and ends the invention further resides in the novel details of construction, combination and arrangement of parts, all of which will be first fully described in the following detailed description, then be particularly pointed out in the appended claims, reference being had to the accompanying drawings, in which:—

Figure 1:
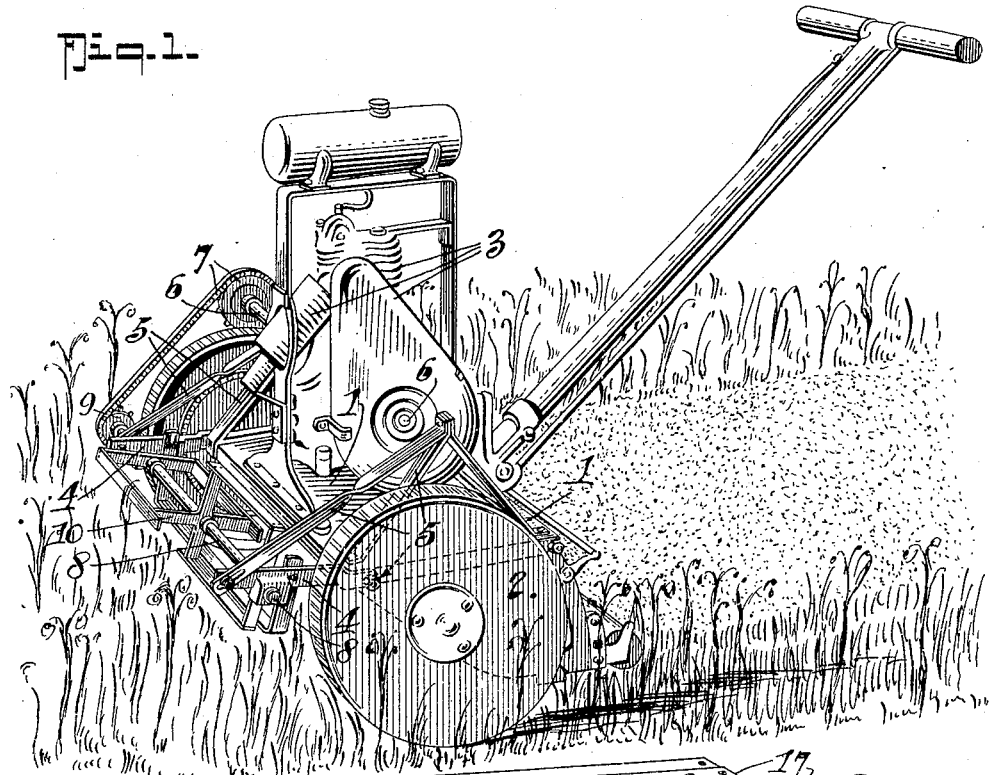
Figure 1 is a perspective view illustrating the invention mounted on a power mower as a topping reel.

In the drawing I have disclosed my improved cutting reel as mounted on a power mower in advance of the main cutting element thereof and on a higher cutting plane so as to adapt it for use as a topping reel. It is to be understood however that the reel may be used in any other association in which other cutting reels may be used.

In the drawing the power mower is generally designated 1, the traction wheels thereof are designated 2, and the power motor 3. The reel supporting hanger arms are designated 4, and are mounted at 5 on the mower and provided with suitable bearings for the reel shaft to rotate in.

The motor shaft is designated 6, and the power transmitting sprocket and chain connections for imparting rotation to the cutting reel from the motor shaft are designated 7.

The structure of the foregoing parts are referred to more in detail in my copending application filed August 26, 1927, Serial Number 215,720 of which this application is a division, and the said parts are not claimed in this application.

In the practical development of my improved cutting reel I provide a cross shaft 8 which, in the disclosure here made, is rotatable in the bearings of the hanger arms 4 and is equipped with a driver sprocket 9 through which rotation is imparted to it from the transmission connections 7.

The rotatable shaft 8 forms a part of the weed and grass topping reel and in this illustration the arms 4 serve to mount the said reel in advance of and on a higher cutting plane than that of the main cutter or mower so that it will cut or top the tall grass and weeds that ordinarily could not be handled by the said main cutter and bring them down to a size for being conveniently and efficiently handled by said main cutter. This advance cutting reel is of peculiar construction and is adapted to cut the weeds and grass more efficiently than the commonly employed types of reels and with a consumption of relatively less power in the attainment of that object, and with less wear because of the fact that it can be rotated more slowly.

Figure 2:
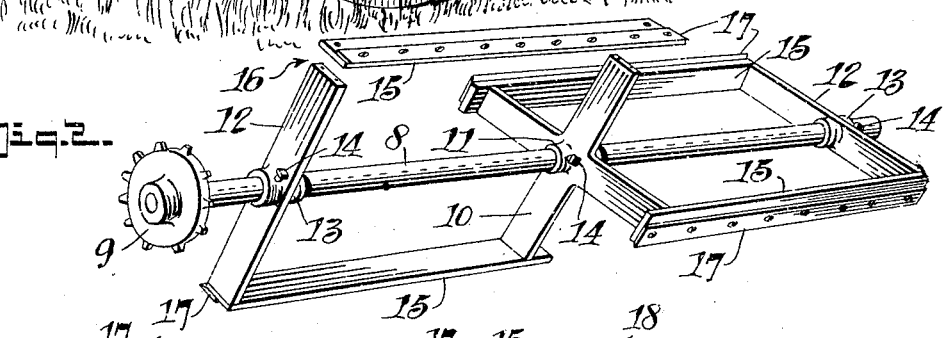
Figure 2 is a detail perspective view illustrating the reel.
Figure 4:
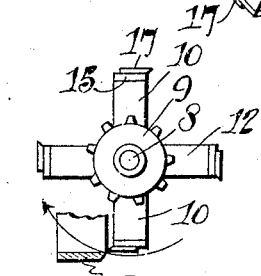
Figure 4 is an end view of the reel, the correlative position of a ledger bar being illustrated in cross section.
Figure 3:
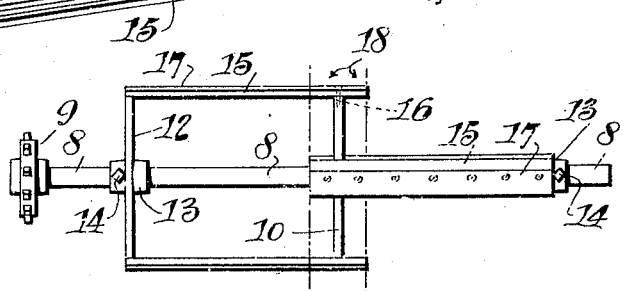
Figure 3 is a front elevation of the reel.

In the construction of this improved form of reel I provide a central cross arm spider 10 having a mounting boss 11, and two end arms or plates 12 having similar bosses 13, the said members 10 and 12 being secured to position upon the shaft 8, with each end plate 12 aligning one spider arm, by the set screws 14 which pass through taps in the bosses and engage the said shaft. Thus the end plates 12 are positioned at right angles to each other. See Figures 2 and 4.

The aligning arms or plates are connected by cross carrier bars 15 removably secured at 16 to the said arm or plate ends and on the advance or cutting edge of each said bar a thin cutter blade 17 is removably and replaceably secured.

Each carrier bar 15 and its blade 17 extends inwardly beyond the spider arm connection so that the two staggered individual cutting units overlap at the center as at 18 to assure perfect and complete cutting through the center as efficiently as though the knives or cutter blades extended full width without a break.

Thus the staggered units cut alternately one blade across all and a little more than one side, then the next in like manner on the other side, and so on, the cuts coming at alternate sides on quarters.

It is a well known fact that helical or curved blades, acting against the ledger bar, tend to and do force tough grass and weeds laterally and often merely deflect them downward without cutting them. This is especially true when the cutting edges are somewhat dull.

Also, these curved blades each cut in conjunction with the ledger bar at one point in their length only at a time, the point of the curve that is passing over the ledger bar at the particular moment, and must be rotated at relatively high speeds to make efficient even cutting possible. This necessitates the employment of a greater number of blades, and the use of more power than is necessary in the use of my improved topping reel, not to speak of the greatly increased wear to which such common types of curved blade high speed reel equipments are subjected.

By providing my straight blades and arranging them in staggered units the cuts are made against the ledger bar across the full length of a blade at once, first at one side then at the other. The strain on the blades is thus equalized and efficiently distributed and by making the broad cuts in the manner stated it is possible to rotate the reel at a relatively slow speed with an attendant reduction in power consumption and wear on the moving parts.

By providing the bars 15, very thin blades 17 may be employed without sacrificing cutting strength, and in addition, a great economy in blade material and blade reconditioning cost is effected since when a blade becomes worn it may be conveniently removed and discarded entirely in favor of a new one, or resharpened. The bars 15 provide the necessary strength, the blades 17 the fine cutting edge.

In the foregoing description I have disclosed a simple construction of cutting reel in which is provided alternately active overlapping series of straight edge blades capable of cutting grass and weeds more efficiently than the common types of cutting reels, and with less wear and power use. I have also disclosed means for employing thin, inexpensive and replaceable cutting blades, without sacrificing cutting strength.

From the foregoing description, taken in connection with the accompanying drawing, it is thought that the novel details of construction, the manner of use and the advantages of my invention will be readily apparent to those skilled in the art to which it relates.

What I claim is:

1. A topping reel for lawn mowers comprising a shaft section projected at its ends to form trunnions, a pair of longitudinal end plates arranged transversely of the shaft and at right angles to each other, a center cross arm spider having one cross arm opposed to each end plate, straight cutter bars removably secured across the ends of aligning pairs of the said end plates and cross arms, cutter blades carried by the cutter bars having one of their edges extended beyond the bars in the direction of rotation, and means whereby rotation may be imparted to the shaft.

2. A topping reel for lawn mowers comprising a shaft section projected at its ends to form trunnions, a pair of longitudinal end plates arranged transversely of the shaft and at right angles to each other, a center cross arm spider having one cross arm opposed to each end plate, straight cutter bars removably secured across the ends of aligning pairs of the said end plates and cross bars, cutter blades carried by the cutter bars having one of their edges extended beyond the bars in the direction of rotation, and means whereby rotation may be imparted to the shaft, the said cutter bars and blades being extended inwardly beyond the center spider to overlap for the purpose described.

FRANK MONTGOMERY RITTER.